US 12,465,038 B2

United States Patent
Kelley et al.

(10) Patent No.: US 12,465,038 B2
(45) Date of Patent: Nov. 11, 2025

(54) LED BULB REPLACEMENT

(71) Applicant: Woodstream Corporation, Lancaster, PA (US)

(72) Inventors: Allyssa Kelley, Lancaster, PA (US); Kierstin Bersheim, Lancaster, PA (US)

(73) Assignee: Woodstream Corporation, Lancaster, PA (US)

( * ) Notice: Subject to any disclaimer, the term of this patent is extended or adjusted under 35 U.S.C. 154(b) by 155 days.

(21) Appl. No.: 18/343,174

(22) Filed: Jun. 28, 2023

(65) Prior Publication Data
US 2025/0000074 A1 Jan. 2, 2025

(51) Int. Cl.
*A01M 1/04* (2006.01)
*A01M 1/10* (2006.01)
*F21K 9/235* (2016.01)
*F21K 9/237* (2016.01)
*F21Y 115/10* (2016.01)

(52) U.S. Cl.
CPC .............. *A01M 1/04* (2013.01); *A01M 1/106* (2013.01); *F21K 9/235* (2016.08); *F21K 9/237* (2016.08); *F21Y 2115/10* (2016.08)

(58) Field of Classification Search
CPC ......... A01M 1/04; A01M 1/106; F21K 9/235; F21K 9/237
See application file for complete search history.

(56) References Cited

U.S. PATENT DOCUMENTS

| | | | |
|---|---|---|---|
| 2012/0096760 A1* | 4/2012 | Chang | A01M 1/04 43/113 |
| 2015/0144713 A1* | 5/2015 | Formico | A01M 1/2044 239/289 |
| 2021/0153492 A1* | 5/2021 | Chang | A01M 1/04 |
| 2023/0123062 A1* | 4/2023 | Lubic | A01M 1/14 43/107 |
| 2023/0284605 A1* | 9/2023 | Rubel | A01M 1/04 |
| 2023/0284606 A1* | 9/2023 | Koehler | A01M 1/04 |
| 2023/0329215 A1* | 10/2023 | Zheng | A01M 1/04 |

* cited by examiner

*Primary Examiner* — Christopher E Dunay
(74) *Attorney, Agent, or Firm* — Barley Snyder (57) ABSTRACT

An insect trap includes a housing having an insect receptacle, a cover assembly attached to the housings, and a lighting element attached to the cover assembly. The cover assembly is rotatable relative to the housing between a closed position in which the lighting element is arranged within an interior of the housing, and an opened position in which the lighting element is removed from the interior of the housing for replacement.

18 Claims, 8 Drawing Sheets

LED BULB REPLACEMENT

FIELD OF THE INVENTION

The present invention relates to the field of pest control, and more particularly, to an improved insect trap.

BACKGROUND

Insect traps, including live-catch traps and killing traps, may implement an internal light source for attracting insects, such as a light-emitting diode (LED) lamp. According to insect traps of the prior art, the light source and/or other associated electrical components of the trap are not accessible to a user after the trap has been manufactured, or are only accessible via a lengthy and/or difficult disassembly process. As a result, a failure of any of these components may render the trap permanently unusable. In the alternative, repair of the trap may require professional assistance, and/or the expenditure of considerable time by a user.

An insect trap which permits easy replacement or repair of its lighting element(s) and/or other electrical or mechanical components thereof is desired.

SUMMARY

An insect trap according to an embodiment of the present disclosure comprises a housing defining an insect intake opening, a cover assembly movably connected to the housing between an opened and a closed position, and a lighting element (e.g., an LED lamp). The lighting element is arranged within the housing and adapted to attract insects into the intake opening. The housing and cover assembly are adapted such that the lighting element is accessible and removable from the trap with the cover assembly in the opened position.

According to another embodiment of the present disclosure, an insect trap comprises a housing including an insect receptacle, a cover assembly rotatably attached to a top of the housing, and an illuminating element removably attached to the cover assembly. The cover assembly is rotatable relative to the housing between a closed position in which the illuminating element is arranged within an interior of the housing, and an opened position in which the illuminating element is removed from the interior of the housing.

BRIEF DESCRIPTION OF THE DRAWINGS

The invention will now be described by way of example with reference to the accompanying figures, of which.

DETAILED DESCRIPTION OF THE EMBODIMENTS

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Embodiments of the present disclosure include an insect trap having an easily replaceable lighting element or lighting assembly. More specifically, a representative trap includes a housing defining an insect intake opening and a receptacle in communication therewith. The lighting element is arranged within the housing and is adapted to attract insects into the intake opening. A cover assembly is attached to the housing and is movable between a closed position wherein the lighting element is arranged within the housing, and an opened position wherein the lighting element is at least one of removed from the housing or otherwise accessible from an exterior thereof. In this way, with the cover assembly in the opened position, a user may easily replace the lighting element or related components. In some embodiments, the cover assembly is rotatably connected to a remainder of the housing, and rotatable between the opened position and the closed position. In other embodiments, the cover assembly is removably attached to the housing, wherein the opened position is associated with the cover assembly being removed from the housing entirely, and the closed position is associated with the cover assembly being attached to the housing.

Figure 1:
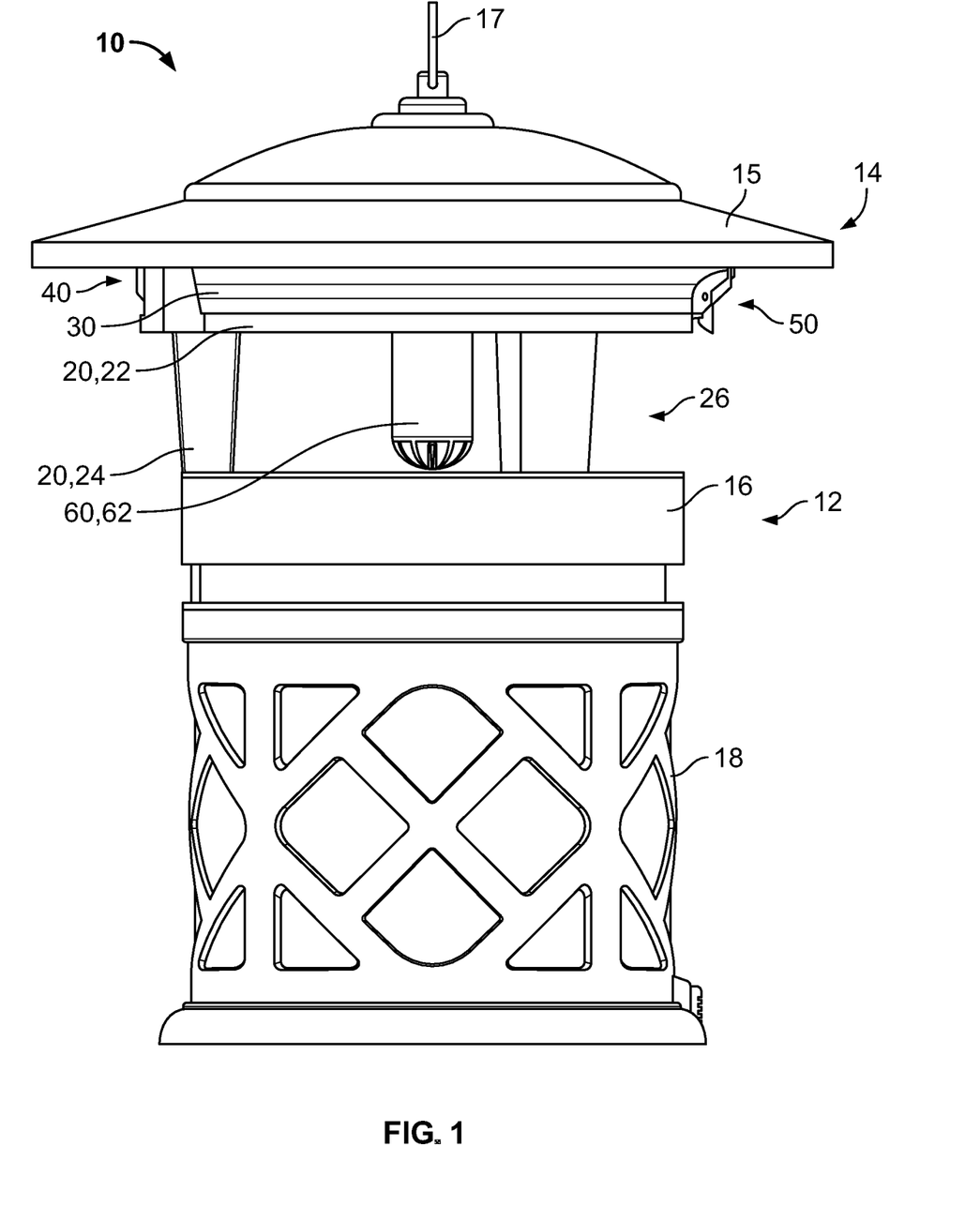
FIG. 1 is a right-side view of an insect trap according to an embodiment of the present disclosure in a first, closed or operating position.
Figure 2:
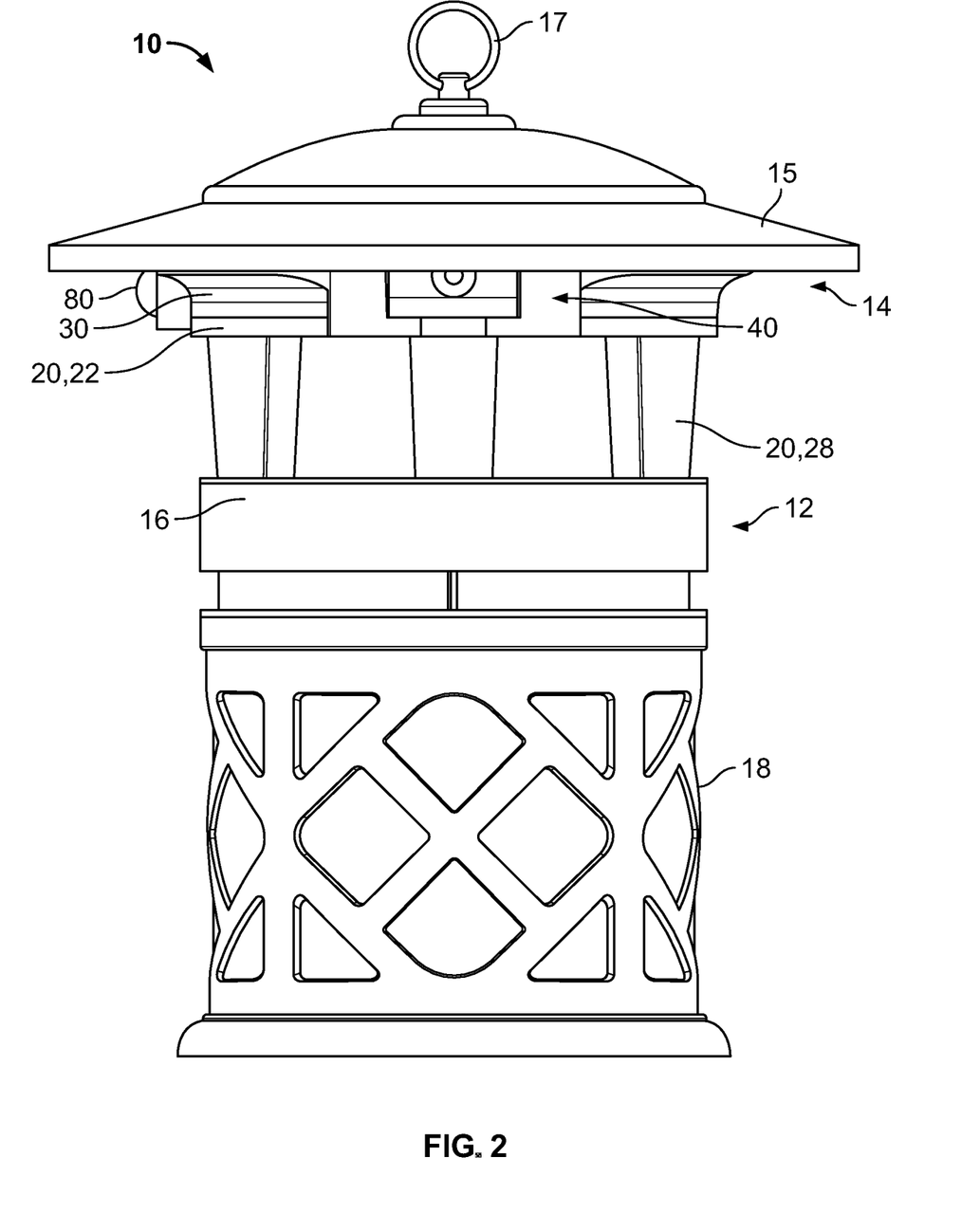
FIG. 2 is rear view of the trap of FIG. 1 in the closed position.
Figure 3:
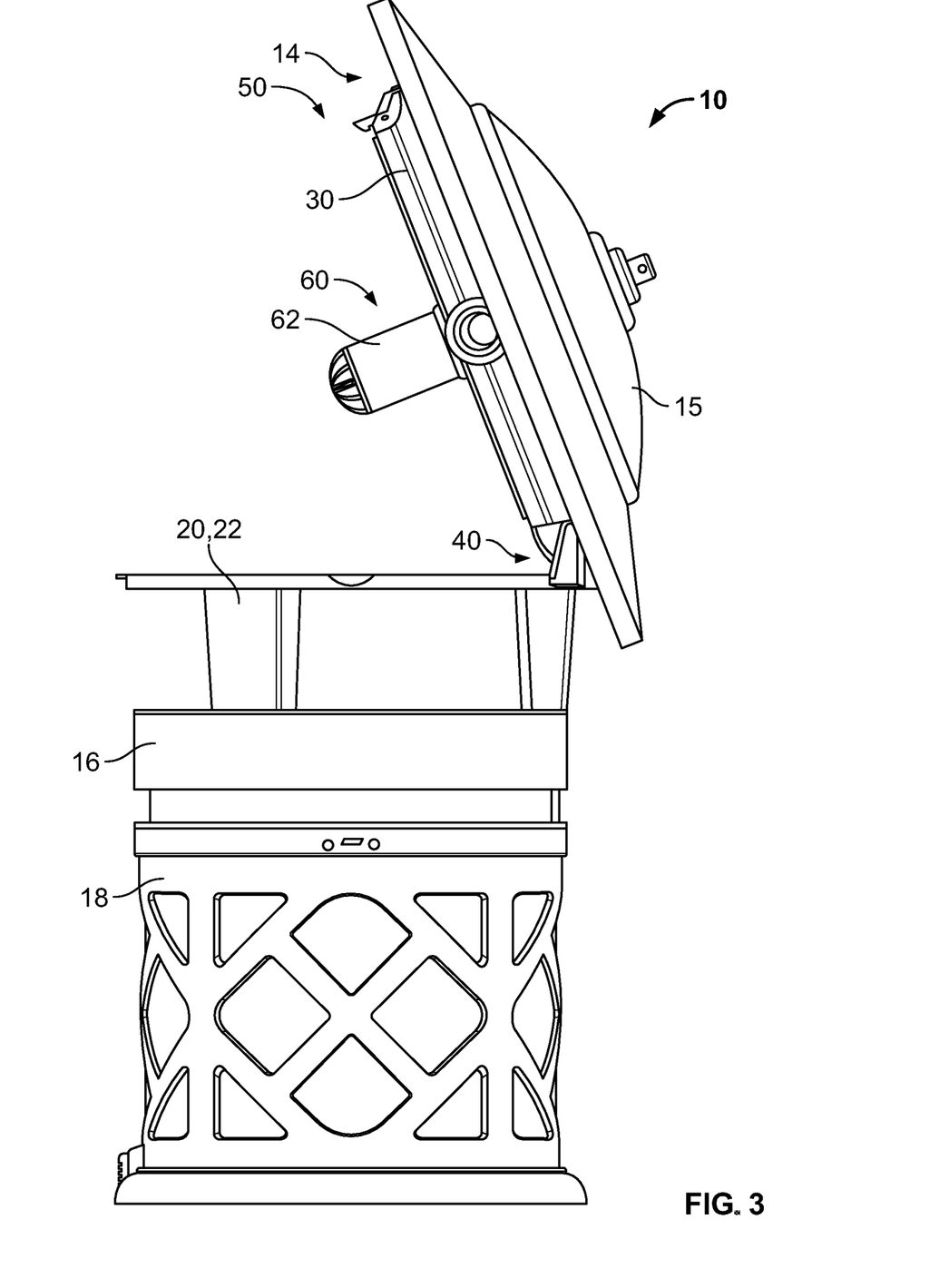
FIG. 3 is a left-side view of the trap of the preceding figures in a second, opened or repair position.

FIGS. 1-3 show an insect trap or trap assembly 10 according to an embodiment of the present disclosure in the closed or operating position (FIGS. 1 and 2) and the opened or repair position (FIG. 3). The insect trap assembly 10 generally includes a main trap housing or body 12, a cover assembly 14 oriented over the housing, and an insect retaining receptacle 18 removably connected to a bottom of the housing. In the exemplary embodiment, the housing 12 comprises multiple subcomponents including a primary base or base component 16 and a cover support 20 fixedly attached thereto in an elevated orientation. Similarly, the cover assembly 14 includes, for example, a lighting base 30 and a roof or cover 15 removably attached thereto.

The cover support 20 includes a substantially circular support plate or base 22 having a plurality of posts or standoffs 28 extending downwardly therefrom. See also FIG. 4. The posts 28 are adapted to engage with complementary openings formed into a top surface of the base 16.

Figure 4:
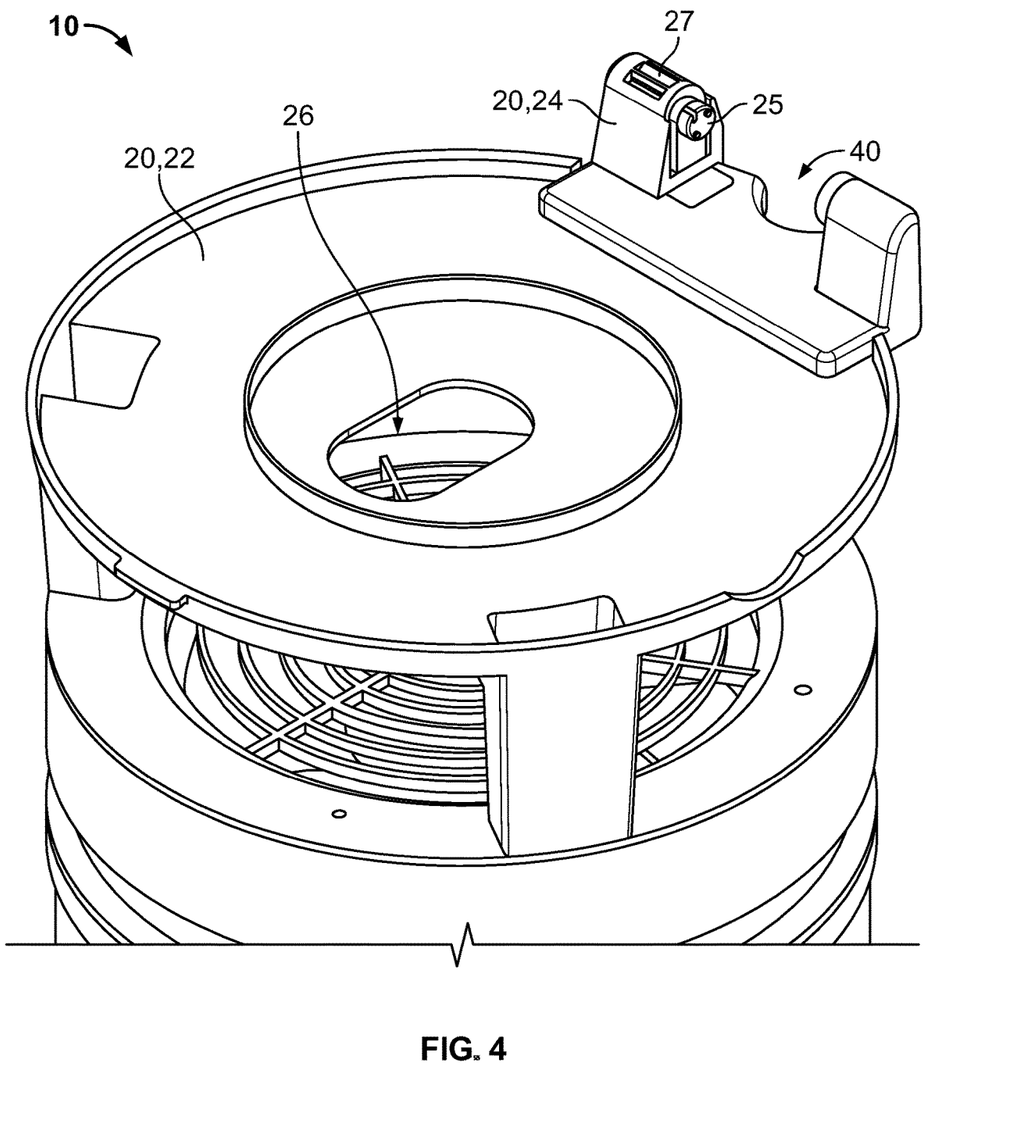
FIG. 4 is a top perspective view of the trap of the preceding figures with a cover assembly thereof removed for clarity.

In other embodiments, the posts 28 can be formed integrally with each of the support plate 22 and the base 16. The posts 28 are preferably spaced about a circumference associated with a radial perimeter of the base 16. The posts 28 define gaps between the base 16 and the support plate 22. The gaps are adapted (e.g., sized, shaped and positioned) to allow insects to pass into the interior of the trap assembly 10. It is appreciated that although three posts 28 are shown, other numbers of posts may be provided to create the offset or gap.

The cover 15 may define a circular, dome-shaped element that is removably attached to the lighting base 30 via, for example, a snap-fit connection. The cover 15 preferably includes a hanging ring 17 for suspending the trap assembly 10 by a hook or other mounting apparatus. The cover 15 optionally contains one or more solar cells arranged on an exterior thereof for powering the various electrical components located on or within the trap assembly 10.

A lighting assembly 60, including a lighting element 62 (e.g., an LED lamp), is arranged within an interior of the trap assembly 10 with the trap in the closed position. As would be understood by one of ordinary skill in the art, the lighting element 62 is adapted to attract insects into the trap, wherein they may be further drawn or forced (e.g., via an intake fan) into the trap receptacle 18. In one embodiment, at least a portion of the lighting assembly 60 is removably attached or connected to the lighting base 30. The lighting assembly 60 is operatively connected to a power source, such as an AC power supply, battery source, or solar powered cells. The power source may be located on or within the trap assembly 10 or may be externally provided. Control of the lighting assembly 60, as well as other powered tap features (e.g., an intake fan, a killing mechanism, etc.), may be controlled via a switch or button 80 fixed to a side of the lighting base 30 (see FIG. 2).

As shown in FIG. 3, the lighting base 30 is rotatably attached to the cover support 20 via a hinge or hinge assembly 40. In one embodiment, the hinge assembly 40 is defined by integral, complementary features of the cover support 20 and the lighting base 30. The trap assembly 10 further includes a latch assembly 50 adapted to selectively fix the lighting base 30 to the cover support 20 in the closed position illustrated in FIGS. 1 and 2.

With the lighting base 30 and cover assembly 14 in the opened position shown in FIG. 3, the lighting assembly 60, including the lighting element 62, is biased out of an interior of the trap. In this way, the lighting element 62 is easily accessible for inspection and/or replacement by a user. Positioning the cover assembly 14 in the opened position further provides convenient access to portions of the interior of the trap for the purpose of cleaning. For the purpose of this description, the interior of the trap may be considered an internal space defined by the housing 12, including the cover support 20.

FIG. 4 illustrates the trap assembly 10 with the cover assembly 14 removed, exposing the support plate 22. The support plate 22 comprises a generally circular or disk-shape having an elongated slot or opening 26 formed through a center thereof. The opening 26 extends or is elongated in a direction generally normal to a pivoting axis of the cover assembly 14 and generally radially outward with respect to the center of the plate. In this way, the arcing motion of the lighting element 62 is accommodated through the opening 26 as the cover assembly 14 is moved between the opened and closed positions. This can be visualized in FIG. 6.

A pair of supports 24 extend vertically from a top surface of the support plate 22 and define opposing, inwardly extending trunnions or axles 25 which form a portion of the hinge assembly 40. A series of notches or teeth 27 may be formed in one of more of the supports 24 for defining a plurality of rotational positions of the cover assembly 14 with respect to the support plate 22. Via engagement of the notches 27 with corresponding features of the lighting base 30, the lighting base (and the cover assembly 14) may be held in one of a plurality of opened positions without the need for external support.

Figure 5:
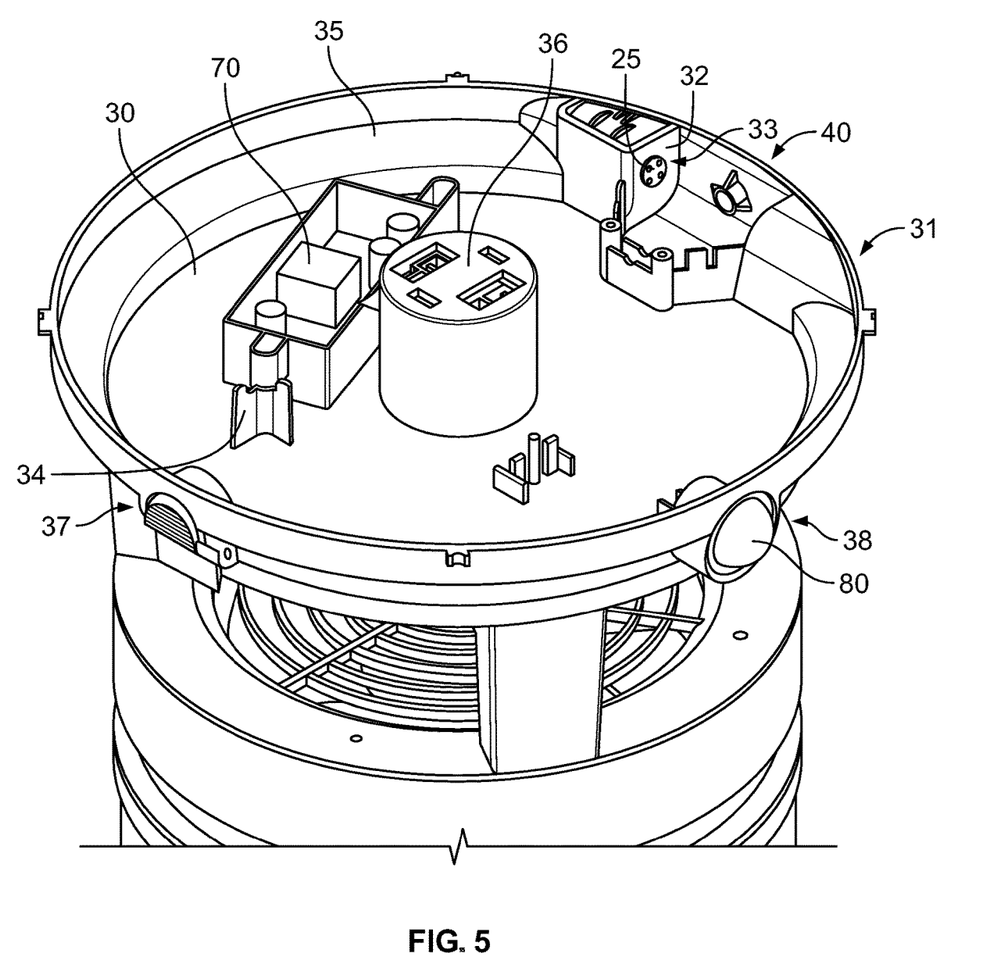
FIG. 5 is a top perspective view of the trap of the preceding figures in the closed position with a cover thereof removed for clarity.

FIG. 5 illustrates the lighting base 30 in greater detail. As shown, the lighting base 30 comprises a circular or disc-shaped element. The lighting base 30 defines a pair of recesses 31 on an underside thereof for receiving the supports 24 of the support plate 22. Each recess 31 is defined in part by a vertically extending sidewall 32. Each of the sidewalls 32 defines a through hole 33 (one being visible in the figure). The through holes 33 are arranged coaxially with one another and are adapted to receive the pivoting axles 25 of the support plate 22 for defining the remainder of the hinge assembly 40.

The lighting base 30 further defines standoffs 34 formed on a top surface thereof and support, for example, a control unit 70 adapted to operate the lighting assembly 60, as well as other powered components of the trap. An annular outer rim 35 of the lighting base 30 defines a second recess 37 receiving a pivoting latch 52 of the latch assembly 50 (see FIG. 7), as well as a through hole 38 receiving the switch 80. The lighting assembly 60 is fitted within a socket 36 formed into an underside of the lighting base 30. The lighting assembly 60 may be operatively connected to the control unit 70 and/or a power supply via the illustrated plug openings formed through the socket 36.

Figure 6:
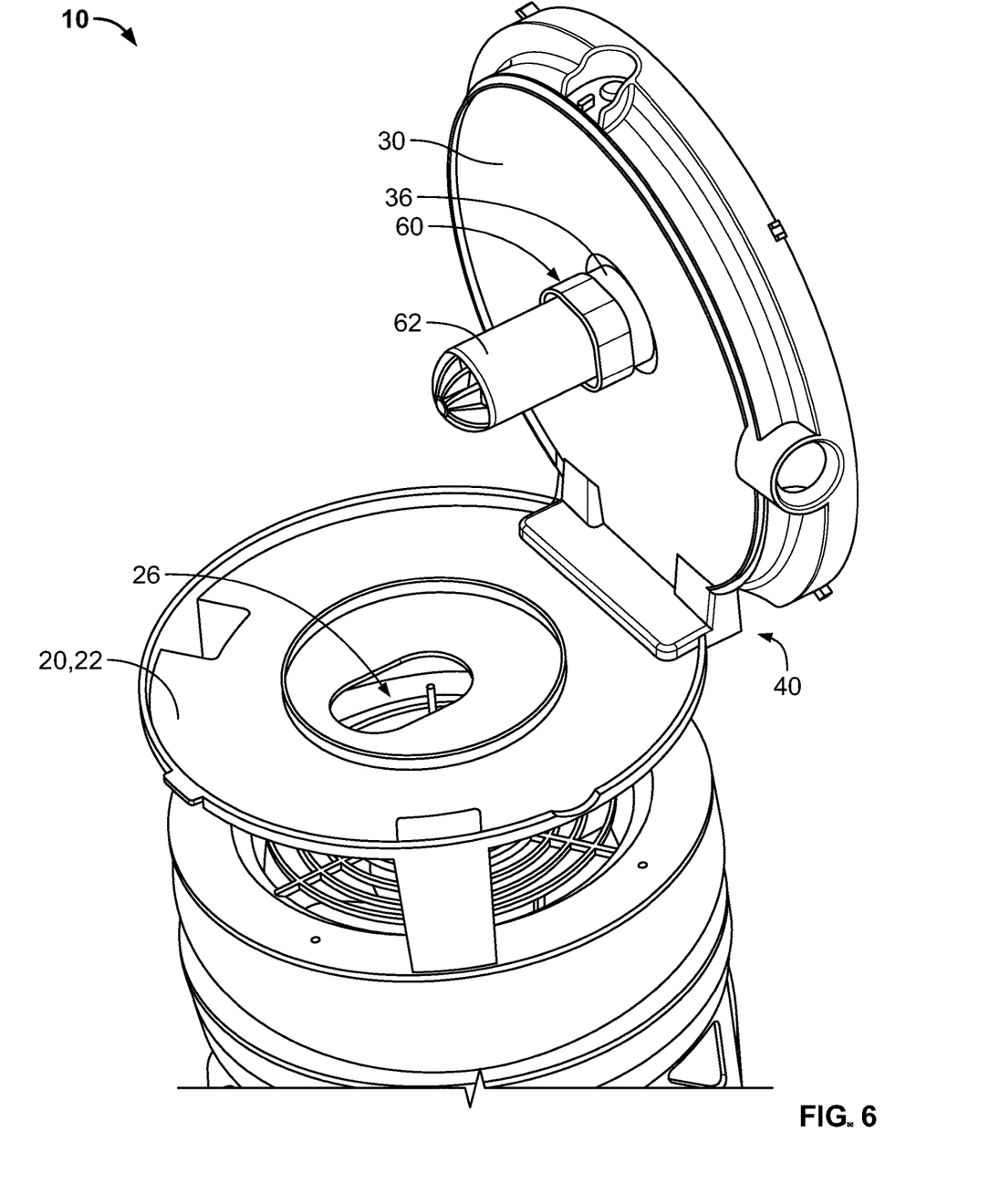
FIG. 6 is a top perspective view of the trap of the FIG. 5 in the opened position.

A simplified view of the trap assembly 10 in the opened position is shown in FIG. 6. As can be seen, with the lighting base 30 pivoted relative to the cover support 20, the lighting assembly 60 and/or the lighting element 62 are easily accessible for removal from the socket 36. In this way, no significant disassembly of the trap is required to access the lighting element 62, which is a significant advantage over sealed traps of the prior art.

Figure 7:
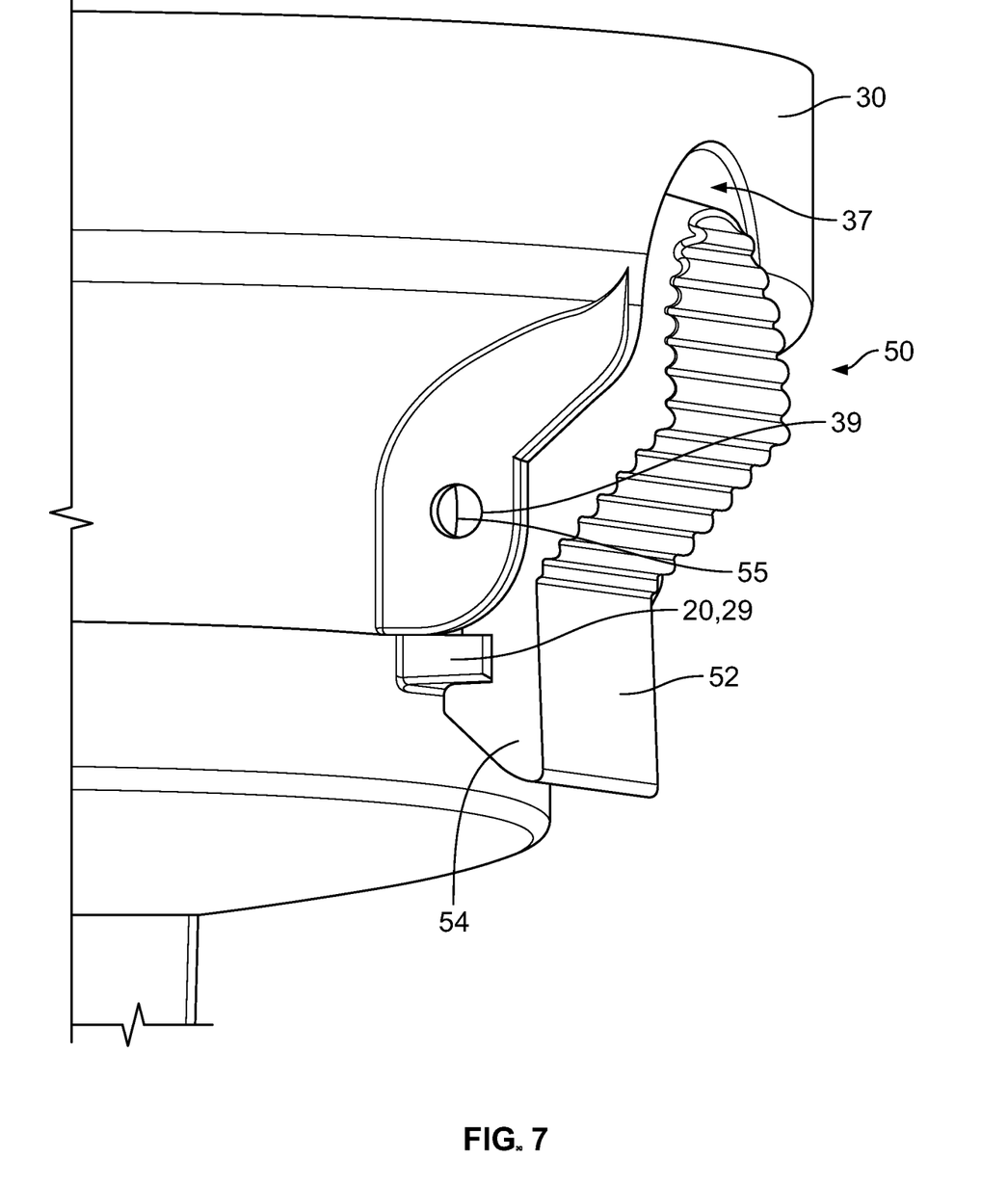
FIG. 7 is a side perspective view of a latch assembly of the trap according to an embodiment of the present disclosure.
Figure 8:
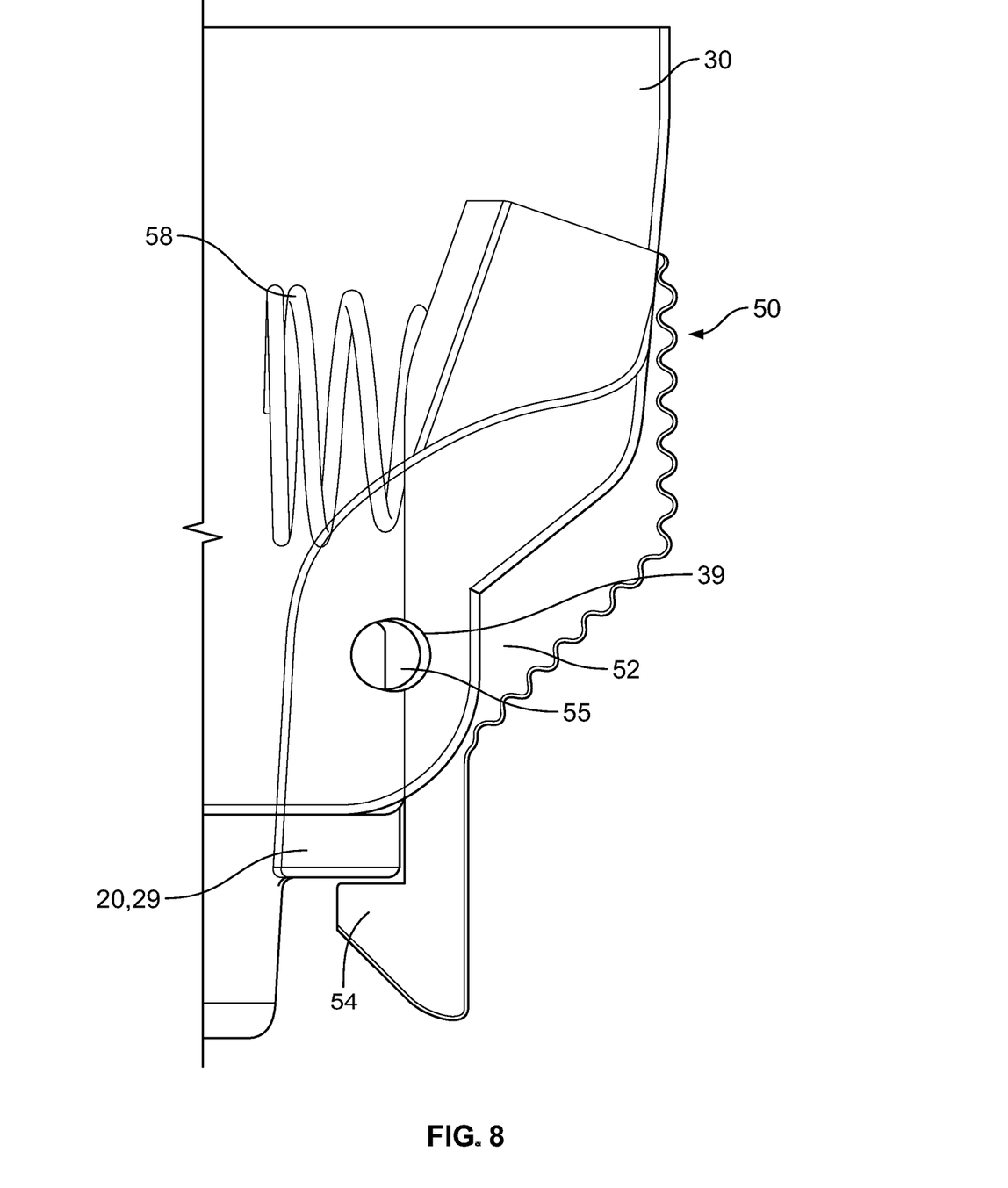
FIG. 8 is a side view of the latch assembly of FIG. 7 showing internal features thereof.

FIGS. 7 and 8 are detailed views of the latch assembly 50 used to selectively secure the lighting base 30 (and cover assembly 14) to the cover support 20. The latch assembly 50 includes a pivoting latch 52 arranged within the recess 37 formed in the lighting base 30. Specifically, cylindrical protrusions 55 of the latch 52 define axles extending through apertures 39 of the lighting base 30, such that the latch 52 may be pivoted. In the locked position shown, a protruding lip 54 of the latch 52 engages with a corresponding catch or lip 29 defined on the cover support 20. The latch 52 is held in the locked position by an elastic biasing element, such as a spring 58, as shown in FIG. 8. The latch assembly 50 provides an easy and effective means for which to secure the cover assembly 14 in the closed position relative to a remainder of the trap assembly 10. It further provides sufficient holding force over other closure methods such that the trap assembly 10 may be hung from the cover assembly 14 without risk of opening.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. An insect trap, comprising:
a housing defining an insect intake opening and an insect receptacle in communication with the intake opening;
a lighting element arranged within the housing and adapted to attract insects into the intake opening; and
a cover assembly movably connected to the housing between a closed position, and an opened position in which the lighting element is removable from the trap, the cover assembly includes a lighting base rotatably attached to the housing, the lighting element is removably attached to the lighting base such that the lighting element is arranged within an interior of the housing with the cover assembly in the closed position, and the lighting element is removed from the interior of the housing with the cover assembly in the opened position, the housing includes a cover support base arranged over the insect intake opening and defining a lighting element opening, the lighting element received through the lighting element opening with the cover assembly in the closed position.

2. The insect trap of claim 1, wherein the cover assembly further includes a cover arranged over and removably attached to the lighting base.

3. The insect trap of claim 1, wherein a socket is defined in an underside of the lighting base and receives at least a portion of the lighting element.

4. The insect trap of claim 1, wherein the lighting element is removed from the lighting element opening when the cover assembly is moved from the closed position to the opened position.

5. The insect trap of claim 4, wherein the lighting base is hingedly attached to the cover support base.

6. The insect trap of claim 5, wherein the cover support base and the lighting base each define a portion of a hinge assembly.

7. The insect trap of claim 6, wherein the lighting element opening is elongated in a direction generally perpendicular to a rotational axis of the hinge assembly.

8. The insect trap of claim 7, wherein the lighting element opening is elongated in a radial direction relative to a center of the lighting base.

9. The insect trap of claim 1, further comprising a latch assembly selectively securing the lighting base to the cover support base in the closed position.

10. The insect trap of claim 9, wherein the latch assembly includes:
a latch pivotally mounted to the lighting base and elastically biased into a locking position; and
a catch defined by the cover support base.

11. The insect trap of claim 1, wherein the cover support base includes a generally planar circular plate having an annular lip extending vertically therefrom and receiving at least a portion of the lighting base with the cover assembly in the closed position.

12. The insect trap of claim 1, further comprising a through hole formed through an annular sidewall of the lighting base and adapted to receive a switch controlling operation of the lighting element.

13. The insect trap of claim 1, wherein the lighting element is removable from the trap independent of the intake opening.

14. An insect trap, comprising:
a housing including an insect receptacle;
a cover assembly rotatably attached to a top of the housing; and
an illuminating element removably attached to the cover assembly, the cover assembly rotatable relative to the housing between a closed position in which the illuminating element is arranged within an interior of the housing, and an opened position in which the illuminating element is removed from the interior of the housing.

15. The insect trap of claim 14, further comprising a locking assembly selectively fixing the cover assembly in the closed position relative to the housing.

16. The insect trap of claim 14, wherein the illuminating element includes an LED lamp.

17. The insect trap of claim 14, wherein the illuminating element is pluggable into to an underside of the cover assembly.

18. An insect trap, comprising:
a housing defining an insect intake opening and an insect receptacle in communication with the intake opening;
a lighting element arranged within the housing and adapted to attract insects into the intake opening; and
a cover assembly movably connected to the housing between a closed position and an opened position in which the lighting element is removable from the trap, the cover assembly includes a lighting base rotatably attached to the housing, the lighting element is removably pluggable into a socket in an underside of the lighting base when the lighting base is rotated to the opened position.

* * * * *